United States Patent [19]

Worden et al.

[11] Patent Number: 5,250,947
[45] Date of Patent: Oct. 5, 1993

[54] ALTITUDE TAPE FOR AIRCRAFT DISPLAYS

[75] Inventors: James K. Worden, Glendale; John C. Todd, Phoenix; Gerald B. Jones, Jr., Glendale, all of Ariz.

[73] Assignee: Honeywell Inc., Minneapolis, Minn.

[21] Appl. No.: 851,585

[22] Filed: Mar. 16, 1992

[51] Int. Cl.⁵ .............................................. G01C 23/00
[52] U.S. Cl. .................................. 340/973; 340/975; 364/433
[58] Field of Search ............... 340/971, 973, 977, 968, 340/966, 974, 975; 73/179, 384; 364/433

[56] References Cited

U.S. PATENT DOCUMENTS

| | | | |
|---|---|---|---|
| 4,149,148 | 4/1979 | Miller et al. | 340/721 |
| 4,860,007 | 8/1989 | Konicke et al. | 340/973 |

Primary Examiner—Brent Swarthout
Attorney, Agent, or Firm—Arnold Albin; Dale E. Jepsen; Albin Medved

[57] ABSTRACT

A moving altitude tape for a flight instrument display adapted to provide intuitive visual cues for determining deviation from a desired altitude. A window incorporates a digital altitude readout and a pointer index which is aligned with calibration marks on the altitude tape. In use the tape exhibits a motion in accordance with deviations in altitude of the aircraft and displays a vernier indication of such deviations with respect to the reference index. The tape further includes indicia associated with the reference index for defining predetermined increments of altitude deviation in accordance with commonly commanded altitudes, and a further pointer indicative of actual altitude deviation from a preset altitude.

2 Claims, 6 Drawing Sheets

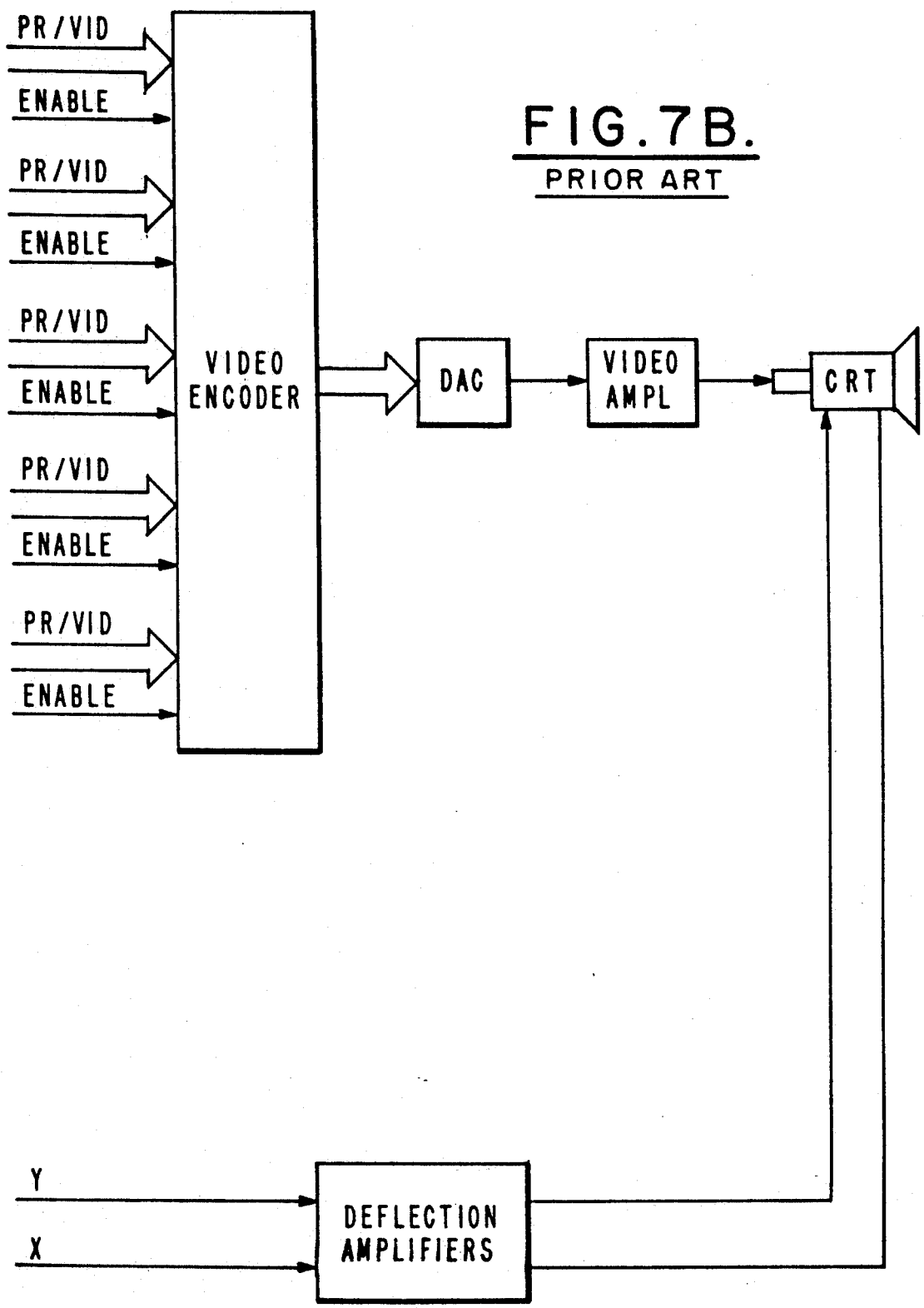

ALTITUDE TAPE FOR AIRCRAFT DISPLAYS

BACKGROUND OF THE INVENTION

1. Field of the Invention

The invention relates to synthetically generated displays for aircraft pilots, and more particularly to integrated displays which provide the pilot with aircraft altitude information and the like.

2. Description of the Prior Art

In the use of electronic display systems for aircraft instrumentation, which may replace 10 or more conventional mechanical indicators, it has become increasingly important to devise methods for presenting the information to the flight crew in a clear, uncluttered manner. As the quantity and the complexity of the symbology placed on an indicator increases, the risk of misinterpretation of data due to visual clutter and overlapping symbology becomes significant.

In order for the pilot to maintain or achieve a desired altitude, it is necessary to display accurate information as to actual altitude of the aircraft and command information indicating the altitude to be effected to achieve the optimum flight situation.

In providing such a display, problems arise in allowing the pilot readily to maintain the desired altitude. For ease of operation, the pilot should be able to determine at a glance whether the aircraft has deviated from the desired altitude, which is usually a multiple of 500 feet or an altitude as selected on the control panel and indicated by a "bug." As shown in FIG. 1, which is representative of a typical prior art integrated flight instrument display, it is difficult to determine whether there has been a change in altitude, or indeed if the desired altitude was reached, without a close reading of the display. Thus, an altitude scale or tape 10 represents barometric altitude in increments of 200 feet from about 2,500 feet to 7,000 feet. A digital readout of radar altitude is presented at the bottom center 12 of the display, with a range up to 3,000 feet. In the barometric altitude region there is not enough resolution on the scale to notice small deviations. Further if rolling digits are used to provide an indication of altitude trend, writing and processing time is substantially increased. The time required for the processor to calculate the image pattern and to store the digital elements in memory is considerable and may impose unacceptable restrictions on the display rate and other required processor tasks. However, the present invention does not preclude the use of rolling digits for displays with adequate processing and writing capability. FIG. 6 shows one such application.

The present invention utilizes an improved tape presentation that provides high resolution and permits ready identification of altitude trends without incurring a penalty in processor requirements or adversely affecting the display update rate. It permits the pilot to tell at a glance that the aircraft has maintained or deviated from the desired altitude. Visual coding of the tape gives the pilot the same information as the arrow on a conventional round dial—whether or not the aircraft is at a multiple of 500 feet of altitude.

It is, therefore, the general purpose of the present invention to provide a display in which aircraft altitude and deviation are simultaneously displayed and to do so in a manner which is intuitively simple for the pilot to use and interpret and thus enhance pilot efficiency and safety.

SUMMARY OF THE INVENTION

The present invention provides an altitude tape for a flight instrument display comprising a window for providing a digital readout and a reference index. In use the altitude tape exhibits a motion in accordance with deviations in altitude of the aircraft, and displays a vernier indication of such deviations with respect to the reference index. The tape further includes indicia associated with the reference index for defining predetermined increments of altitude deviation in accordance with commonly commanded altitudes, and a further pointer indicative of actual altitude deviation from a preset altitude.

BRIEF DESCRIPTION OF THE DRAWINGS

FIGS. 7A and 7B are schematic block diagrams embodying a prior art aircraft flight instrumentation system suitable for energizing the altitude tape display of the present invention.

DESCRIPTION OF THE PREFERRED EMBODIMENTS

Figure 1:
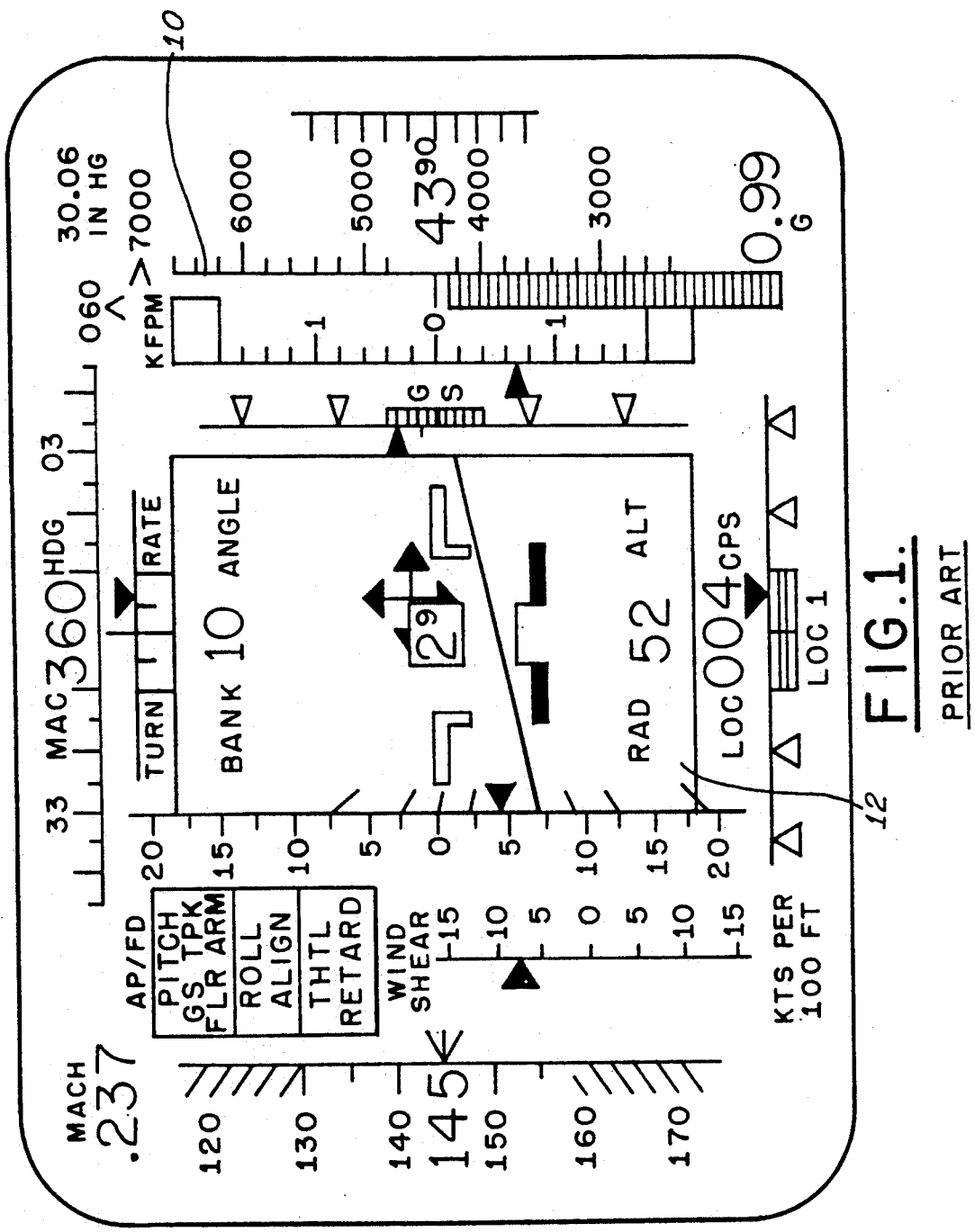
FIG. 1 is a pictorial representation of a typical integrated flight instrument display of the prior art.
Figure 2:
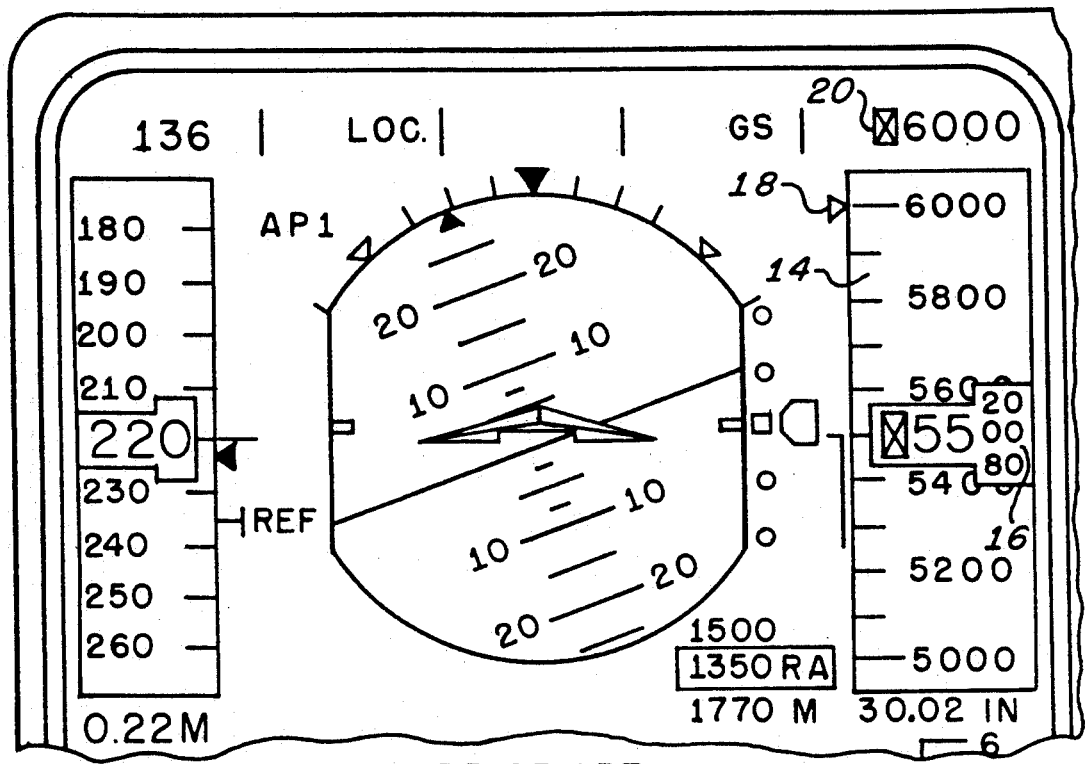
FIG. 2 is a pictorial representation of the altitude tape display format of a prior art flight instrument display, shown in partial plan view.

With reference to FIG. 2, there is shown a prior art display of the type heretofore described. For clarity, only a partial view of the upper portion of the display is shown. This display is a common altitude display currently used on the Gulfstream G IV aircraft, and may be driven by commercially available symbol generator display software, such as Honeywell Part Number 70085700-903. The altitude tape, designated by reference numeral 14, is provided with a plurality of horizontal tick marks, the interval between ticks corresponding to 100 ft increments of altitude. There is also shown a corresponding digital readout 16 and "bug" indicator 18. In the example shown, the aircraft is at an altitude of 5,500 feet, with the bug and corresponding digital readout 20 indicating a desired altitude of 6,000 feet. Note that the pilot must carefully scrutinize the display to read out the numerical altitude value, and the deviation from the bug value requires consideration of the bug pointer and bug digital readout.

Figure 3:
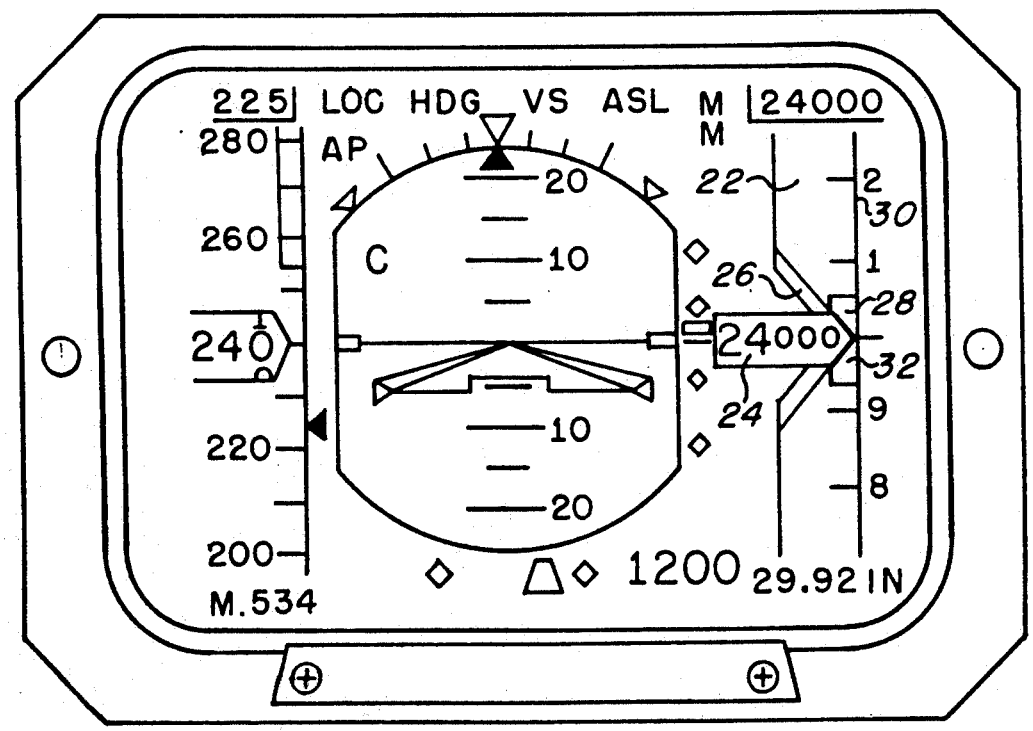
FIG. 3 is a pictorial representation of a flight instrument display including an altitude tape format of the present invention.

Referring now to FIG. 3, the display presentation provided according to the novel concepts of the present invention is shown. The information content of the display unit provides information including both electronically generated symbology as well as discrete information in the form of numerical readouts, which may be displayed on the face of a cathode ray tube, liquid crystal display, and the like. The invention further relates the numerical readouts to positional indicia, thereby providing a flexible system capable of providing a substantially more intuitively readable display than the prior art.

As shown in FIG. 3, the altitude reading, which is provided by a signal from a conventional altitude sensing system such as an air data computer which is commonly used in aviation and serves to convert ambient outside atmospheric pressure to altitude, is represented in the form of an output voltage proportional to altitude or a digital word, and is presented as a moving tape 22 which extends along a vertical line laterally at the right hand border of the display. This configuration is exemplary and not to be considered limiting.

Superposed on the tape 22 is a window 24 which provides a digital numerical readout of altitude. The digital readout displays actual altitude to the nearest 10 feet. Also superposed on tape 22 is a chevron-shaped index 26, whose function is to be described. Window 24 is provided with a pointer 28 which serves as a reference index for altitude readings on a vernier tape scale 30. Typically tape scale 30 is provided with tick marks corresponding to 100 ft intervals with a span of approximately 600 feet. At the 000 and 500 ft ticks the scale is notched by a chevron-shaped index, as described above. Thus, the notch is aligned with the window pointer whenever the current altitude is a multiple of 500 feet.

A further indicator is provided by notched bug 32, which indicates a preset altitude that may be manually inputted by the pilot. The span of the bug is 100 feet, overlaid on the tape scale 30, and the notch will be aligned with the window pointer when the current altitude equals the preselected altitude.

In practice, the various elements of the altitude display may be rendered in color. Typically, the window will be white with green numerals. the tape will be white on a contrasting background, while the bug may be cyan.

A change in altitude of the aircraft is indicated by means of the moving tape scale 22 in conjunction with index pointer 28. A change in altitude results in vertical displacement of the tape to bring correspondingly different tick marks into view. Thus an increase in altitude will result in the tape moving downwardly, while a decrease in altitude will cause the tape to move upwardly. Similarly, window 24 will display a corresponding numerical change in readout. The bug pointer will move to a given altitude tick in response to the preset altitude command, and remain as a fixed marker relative to scale 30 as the tape moves upwards or downwards in response to changes in altitude.

Figure 4D:
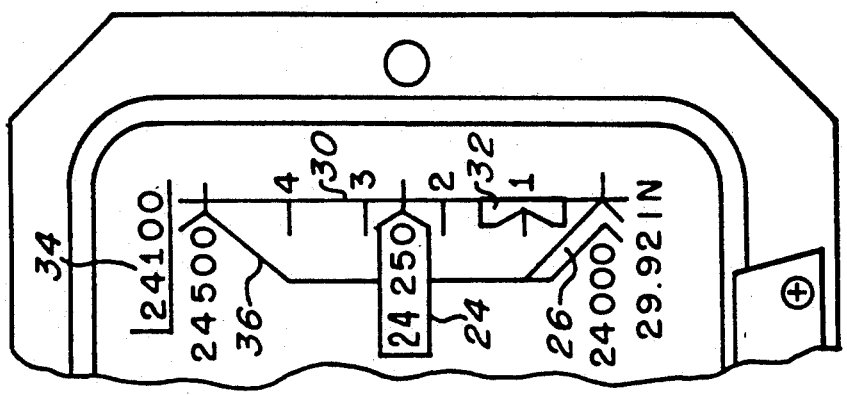
FIGS. 4A-4D are partial pictorial representations of the altitude tape format of the present invention showing display modes for selected altitude deviations.
Figure 4C:
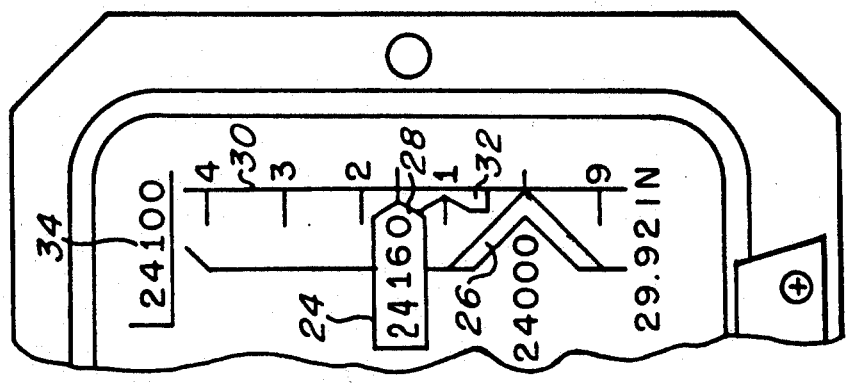
Figure 4B:
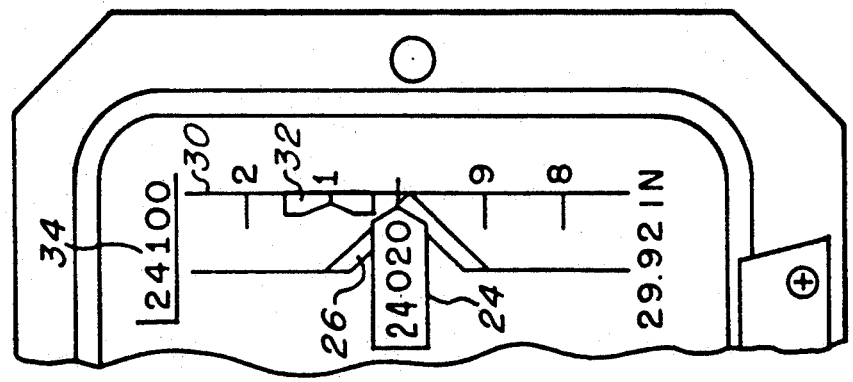
Figure 4A:
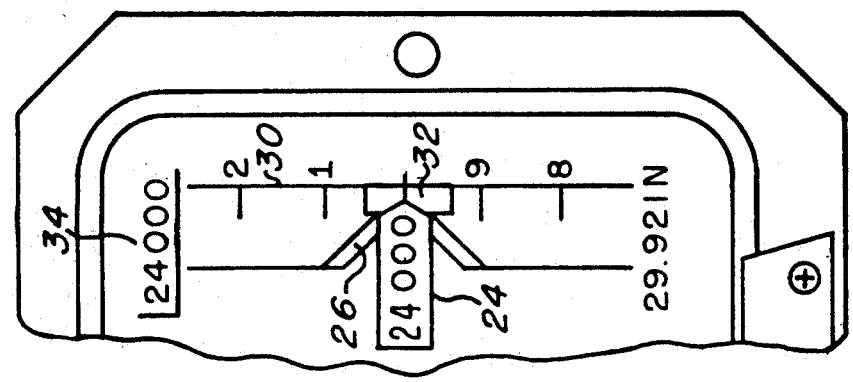

The operation of the tape display may be seen more clearly by examining FIGS. 4A-4D. FIG. 4A represents a condition corresponding to FIG. 3, where the preset altitude readout 34 indicates a desired altitude of 24,000 feet. The double-striped chevron pointer 26 is aligned with bug 32 at the zero tick of tape scale 30, indicating the actual altitude has reached the preset altitude. Numerical readout 24 also shows a value of 24,000 feet.

Referring now to FIG. 4B, the preset altitude reads 24,100 feet and bug 32 rests at the 100 ft tick marker. Bug 32 is readily seen to be misaligned with the pointer of window 24, and readily indicates a negative deviation from the preset altitude. Similarly, chevron 26 rests slightly below the window pointer, indicating the actual altitude is between 24,000 feet and 24,100 feet without necessitating an actual reading of the numerical altitude value. The actual altitude is seen in window 24 to be 24,020 feet.

In FIG. 4C a condition is depicted wherein for the same preset altitude of 24,100 feet pointer 28 lies above bug 32, which is aligned with 100 ft tick mark, and well above notch 26, indicating the actual aircraft altitude exceeds the preset altitude and deviates more than a 50 ft altitude span from the preset value. Here, the numerical readout indicates an actual altitude of 24,160 feet.

A similar condition is shown in FIG. 4D; however, the altitude values are shown to illustrate how chevron pointers 26 and 36 are differentiated, the 000 ft value being a double line index, the 500 ft value being a single line index, enabling the pilot to roughly determine the actual altitude deviation from the preset altitude by quickly scanning the tape, and knowing that there is a 500 ft difference between the tape pointers, he intuitively calculates the actual altitude deviation as around 250 feet from the midpoint position of window 24 with respect to tape scale 30.

Figure 5:
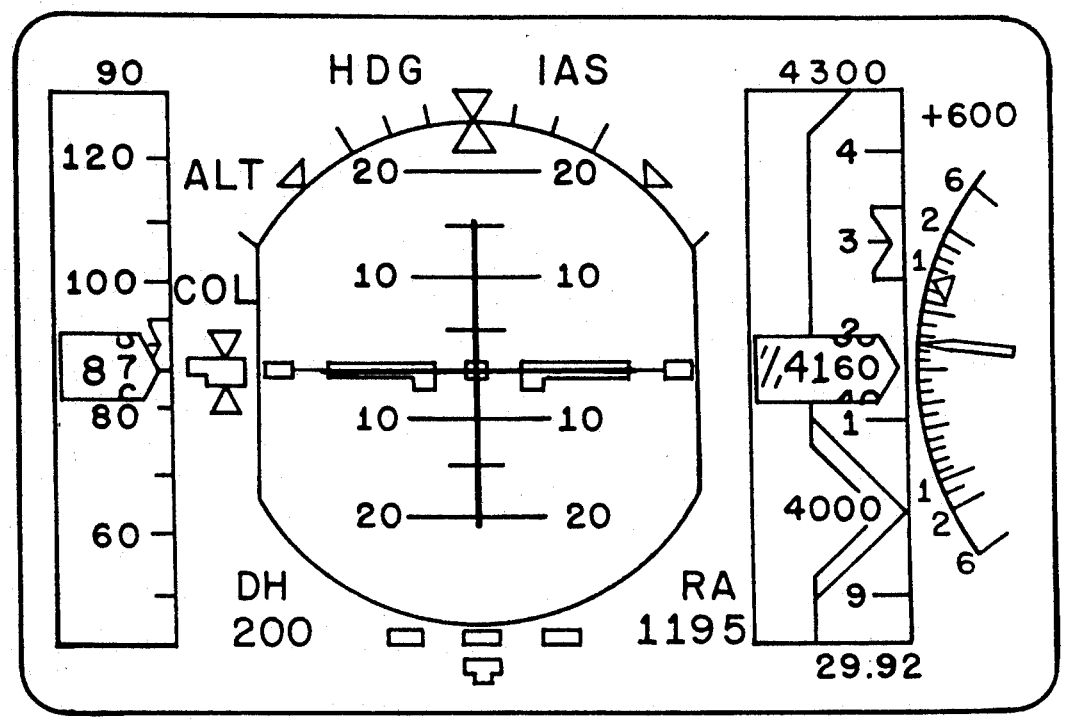
FIG. 5 is a pictorial representation of an alternate altitude tape display embodiment of the present invention.
Figure 6:
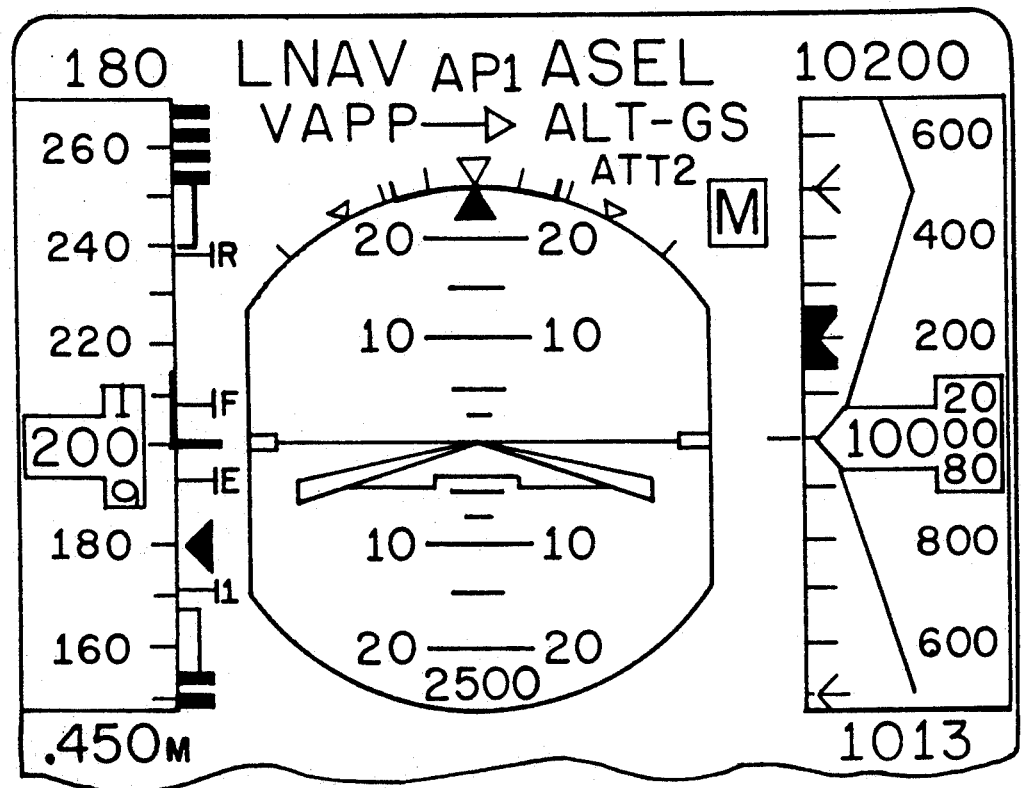
FIG. 6 is a further alternate embodiment pictorial representation of the present invention.

The relative layout of the tape scales and pointers may be varied in practice to suit a customer's needs while retaining the advantageous features of the invention. FIG. 5 shows an alternate embodiment in which the altitude tape is presented in box form against a contrasting raster background. In FIG. 6 the tape scale remains as heretofore, but the bug and window pointer have been directed to point in a direction opposing that of FIG. 3. The scale notch concept has also been extended to provide a sawtooth angulation with intervals of 500 feet between peaks.

Figure 7A:
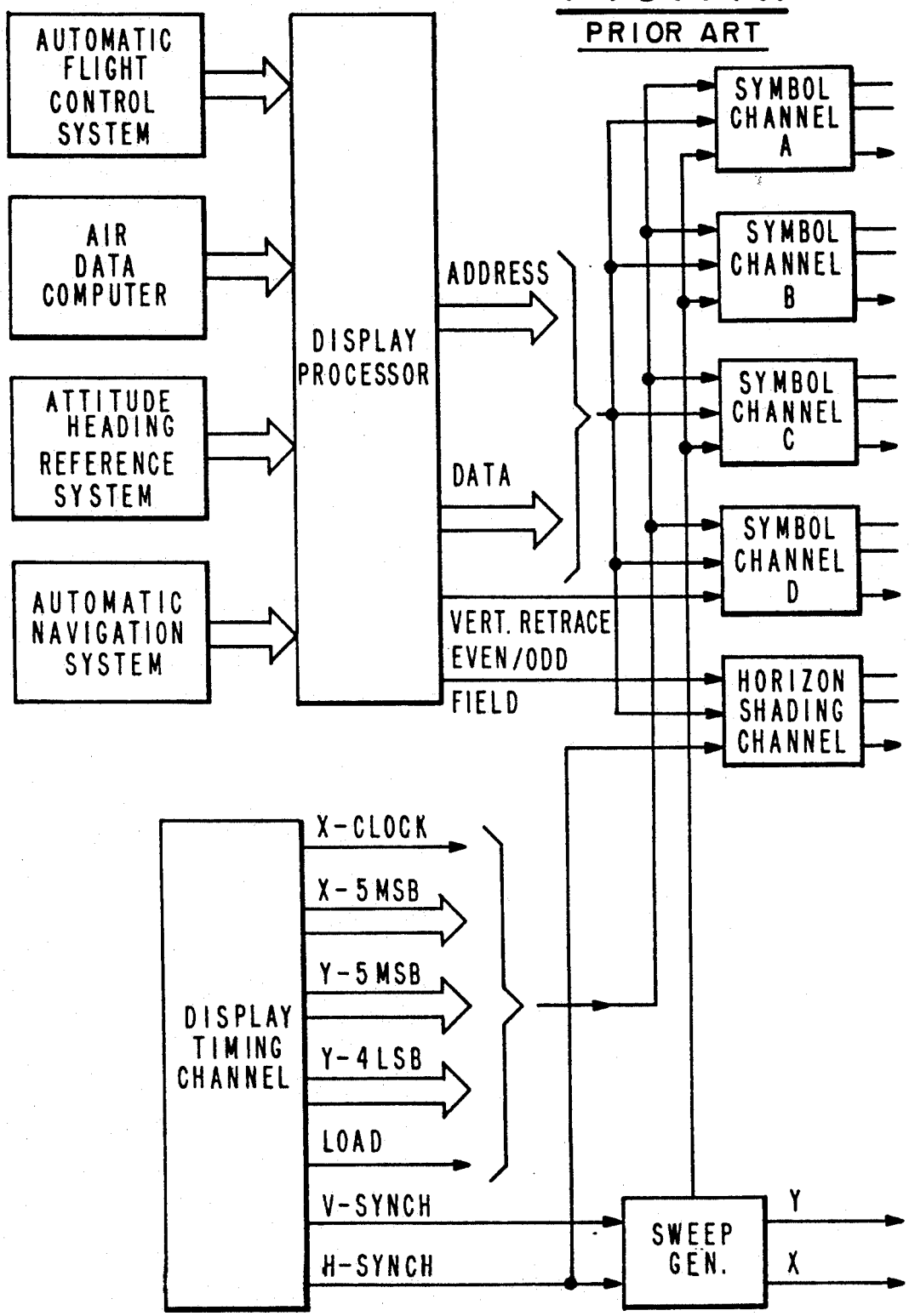

FIGS. 7A and 7B are block diagrams of an aircraft flight instrument display system which is suitable for energizing the altitude tape of the present invention. FIGS. 7A and 7B correspond to FIG. 8 of U.S. Pat. No. 4,149,148 issued Apr. 10, 1979, which is incorporated herein by reference. The aircraft parameters to be displayed are generated by well-known onboard aircraft systems comprising an automatic flight control system, an air data computer, an altitude-heading reference system and an automatic navigation system. The air data information includes barometer setting, pressure altitude, and various speed parameters. All of the subsystems employed in driving the display unit for providing the displays herein discussed comprised commercially available systems which can be used without modification to supply the necessary driving signals to operate the tape display. Therefore, a lengthy, detailed discussion of each of the component parts, subsystems and circuits employed in driving the display is deemed unnecessary and accordingly is omitted in the interest of brevity. It will be appreciated, however, that in some instances minor signal conditioning, well within the skill of the art, may be required to obtain desired compatibility. However, this conditioning is in the form of modification to voltage levels and is a function well known to those familiar with techniques employed in interfacing instruments. The summing, biasing, and scaling of the drive signals to the instrument can be accomplished using digital logic and the appropriate analog-to-digital and digital-to-analog conversions, as desired, although the same techniques can be used equally well for pure digital or pure analog circuitry.

Most of these systems have either been implemented as hard-wired analog logic or digital computer algorithms which, upon receipt of flight and navigational information from onboard radios and flight sensors, output guidance commands that may be implemented using one or more types of flight director displays.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which exclusive property or right is claimed are defined as follows:

1. An improved apparatus for providing a display of flight instrument parameters for a piloted aircraft and having a display face for providing the pilot with an indication of altitude, comprising:

a stationary window defining a field of view for providing a digital readout of altitude, generally disposed laterally on said display face and on a central horizontal axis, said window further defining an altitude reference index pointer, said window adapted for displaying altitude numerals in accordance with a sensed altitude signal, a vertically elongated moveable altitude scale, said scale including a plurality of altitude graduation marks and corresponding altitude numerals extending in predetermined spaced relationship for representing predetermined increments of altitude relative to said index of said window, a given graduation mark corresponding to an increment of altitude and when aligned with said altitude reference index pointer being correspondingly numerically displayed within said window, said altitude scale being responsive to said altitude signal for moving said scale upwardly or downwardly with respect to said altitude reference index pointer and in a direction opposite to changes in altitude of said aircraft, said altitude scale further comprising a plurality of tape index pointers, each of said plurality being disposed at a predetermined altitude increment such that a given tape index pointer is aligned with said altitude reference index pointer when said aircraft is at a desired altitude corresponding to a given multiple of said graduation marks and such that deviations from said desired altitude are indicated by a displacement of said given tape index pointer with respect to said altitude reference index pointer, each of said plurality of tape index pointers bearing an indicia for identifying a predetermined increment of altitude, wherein said indicia is in the form of a chevron comprising a single striped element alternating with a plurality of parallel striped elements, the spacing between successive single striped elements comprising a given plurality of said graduation marks, and the spacing between successive parallel striped elements comprising a given plurality of single striped elements, and further comprising a pilot operated index pointer cooperating with said altitude scale and moveable vertically in predetermined increments independent of said increments of said altitude scale, said pilot operated index pointer being responsive to an altitude command signal for alignment with said altitude scale in accordance with a preselected altitude and cooperating with said altitude reference index pointer such that said pilot operated index pointer and said altitude reference index pointer are aligned when said aircraft has achieved a predetermined altitude as indicated by the position of said pilot operated index pointer on said altitude scale, said pilot operated index pointer having a vertical dimension corresponding to the distance between successive graduation marks on said altitude scale, and operative such that a divergence of said aircraft from an altitude designated by said pilot operated index pointer results in a proportional displacement of said pilot operated index pointer with respect to said altitude reference index pointer, said altitude reference index pointer, said tape index pointer, and said pilot operated index pointer being comprised of complementary chevron indices, such that operation of said aircraft at a pilot command altitude corresponding to a given indicia of said altitude scale results in alignment and superposition of said given indicia, said pilot operated index pointer, and said altitude reference index pointer.

2. Display apparatus as set forth in claim 1, wherein said altitude graduation marks are spaced at 100 ft intervals, said successive parallel striped chevron elements are spaced at 1000 ft intervals, and said successive single striped chevron elements are spaced at 500 ft intervals intermediate said 1000 ft intervals.

* * * * *